US007385983B2

(12) United States Patent
Chen et al.

(10) Patent No.: US 7,385,983 B2
(45) Date of Patent: Jun. 10, 2008

(54) NETWORK ADDRESS-PORT TRANSLATION APPARATUS AND METHOD

(75) Inventors: Jin-Ru Chen, TaiChung (TW);
Chun-Feng Liu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 943 days.

(21) Appl. No.: 10/430,346

(22) Filed: May 7, 2003

(65) Prior Publication Data

US 2003/0210691 A1 Nov. 13, 2003

(30) Foreign Application Priority Data

May 7, 2002 (TW) ............................... 91109399 A (51) Int. Cl.
H04L 12/28 (2006.01)
H04L 12/56 (2006.01)
G06F 15/16 (2006.01)

(52) U.S. Cl. .................. 370/392; 370/401; 709/245
(58) Field of Classification Search ................ 370/389, 370/401, 357, 395.54, 392; 709/245, 249, 709/227, 200–201
See application file for complete search history.

(56) References Cited

U.S. PATENT DOCUMENTS

2002/0024959 A1* 2/2002 Kong .......................... 370/401

2003/0065817 A1* 4/2003 Benchetrit et al. .......... 709/245
2003/0172184 A1* 9/2003 Kong ......................... 709/245
2004/0098512 A1* 5/2004 Lin ............................. 709/249

OTHER PUBLICATIONS

Srisuresh, Tradional IP Network Address Translator (Tradional NAT) RFC 3022, Jan. 2001, p. 1-14.*
NAPT Installation and Configuration, http://research.microsoft.com/msripv6/napt.htm ,Mar. 16, 2001 , p. 1-7.*

* cited by examiner

Primary Examiner—Seema S. Rao
Assistant Examiner—Mon Cheri S Davenport
(74) Attorney, Agent, or Firm—Troxell Law Office, PLLC (57) ABSTRACT

A NAPT apparatus and method implemented with hardware circuits inside a network switch controller is provided. The NAPT apparatus comprises: a translation table for storing related information of NAPT connections; an IP table for storing available translated IPs; a packet parser for receiving a packet to be performed NAPT, parsing related fields of the packet, and generating part of required indexes according to transmission direction of the packet; and a packet translation module for performing NAPT. For a forward packet, the NAPT method employs an indexing means of the translation table and IP table and a recording means to generate a translated IP and a translated port number of the forward packet. For a backward packet, a restoring action corresponding to the recording means is performed to restore required values, thereby checking validity of the backward packet and performing subsequent NAPT.

27 Claims, 8 Drawing Sheets

| | 30 | 31 | 32 | 33 | 34 | 35 | | | | | |
|---|---|---|---|---|---|---|---|---|---|---|---|
| idx | CPU | Used IP | internal IP | internal port number | internal port number offset | internal port connection time | ... | Used IP | internal port number | internal port number offset | internal port connection time |
| 1 | | | | | | | | | | | |
| 2 | | | | | | | | | | | |
| ⋮ EIDX | ... | ... | ..... | ..... | ..... | ..... | ⋮ | ..... | ..... | ..... | ..... |
| $2^n$ | | | | | | | | | | | |

{ N-way }

NETWORK ADDRESS-PORT TRANSLATION APPARATUS AND METHOD

BACKGROUND OF THE INVENTION (a). Field of the Invention

The present invention relates in general to the field of network address-port translation (NAPT), and more particularly to a NAPT apparatus and method that can employ a special recording and restoring way for related indexes, thereby examining validity of backward packets and performing NAPT.

(b). Description of the Prior Arts

In recent years, the Internet becomes more and more popular, and forms an overwhelming global trend. The Internet transceives data by using TCP/IP protocols that adopt IP addressing system, which renders a unique IP address to each network node on the Internet to facilitate the transmission of the data. The current IP version number is 4 (known as IPv4, cf. RFC 791). According to IPv4, an IP address comprises 32 bits that are grouped into four 8-bit sections. Since each section has $2^8=256$ possible combinations, there are $256^4$ available IP addresses theoretically (in fact, usable IP addresses are less than that since part of IP addresses are reserved for other purposes).

However, as there are exponentially increasing computers that need to connect to the Internet, IP addresses may not be enough in some situations. A common case is that the number of IP addresses is less than that of network nodes in a local area network (LAN). Since an IP is necessary for each node to access the Internet, insufficient IP addresses would prevent some nodes in the LAN from connecting to the Internet. To solve this problem, Network Address Translation (NAT) and Network Address-Port Translation (NAPT) are developed.

Before making a description for NAT and NAPT, concepts of public IP and private IP are introduced here. A public IP is a normal IP used in various networks which employ TCP/IP protocols, while a private IP is only used in a local area network, such as the internal network of an institution or family. That is, the private IP cannot be used to connect directly to external networks (e.g. the Internet). The Internet Assigned Number Authority (IANA) reserves three sections of IP addresses for internal networks:

10.0.0.0-10.255.255.255

172.16.0.0-172.31.255.255

192.168.0.0-192.168.255.255

The above private IP addresses are only used in internal networks, and there's no need to register them.

Figure 1:
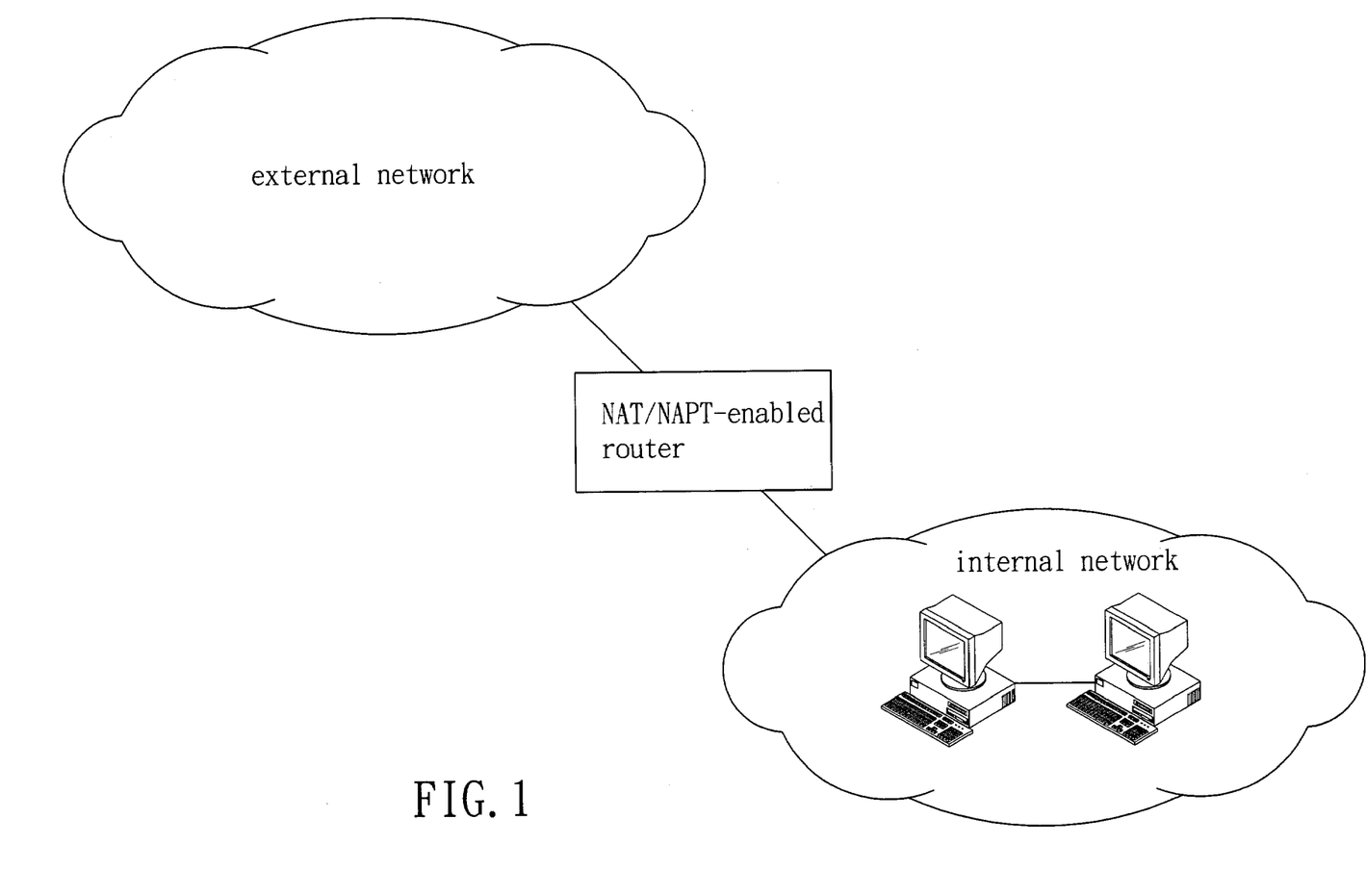
FIG. 1 is a diagram showing that nodes with private IPs in an internal network connect to an external network via a NAT/NAPT-enabled router.

If a network node with a private IP wants to access external networks, a NAT/NAPT-enabled equipment, such as a router, is needed, as shown in FIG. 1. The operation of NAT can be described as follows: when a node with a private IP in an internal network is to transmit packets to external networks, the NAT equipment would first translate the source address (i.e. the private IP) of the packets into an available public IP and then transmit the packets. The NAT equipment would keep a record of the correspondence between the private IP and the public IP; when the external networks are to transmit a packet to the internal network, the NAT equipment would look up the record. If the NAT equipment finds that there is a public IP matching the destination address of the packet, then it translates the destination address into a private IP corresponding to the public IP and forwards the packet to a node with this private IP. Because of one-to-one correspondence between public IPs and private IPs, N public IPs can only serve for N private IPs.

Compared with NAT, NAPT further translates the port, which belongs to Layer 4 of the Open Systems Interconnection (OSI) model, of a packet in addition to IP translation. When a packet is transmitted from an internal network to an external network, NAPT translates the source IP and the source port of the packet; when a packet is transmitted from an external network to an internal network, NAPT translates the destination IP and the destination port of the packet. The "port" can generally refer to the port number field defined in Transmission Control Protocol (TCP)/User Datagram Protocol (UDP), or the identifier field defined in Internet Control Message Protocol (ICMP). In NAPT, correspondence between private IPs and public IPs is not one-to-one, and thus more computers can connect to the Internet simultaneously by using different combinations of public IPs and associated ports.

However, now NAT/NAPT is mostly implemented by software, and the operation speed is slow. If NAT/NAPT is implemented by an application-specific integrated circuit (ASIC), then the operation speed is much faster. A network switch controller with hardware-implemented NAT/NAPT is just an example of this kind. When a node with a private IP in an internal network is to connect to an external network, it would send out a packet to establish a network connection. A switch controller with NAT/NAPT enabled has a built-in translation table for storing information associated with the network connection, for example the source IP and source port of the packet transmitted from the internal network to the external network. The information is used in performing address (and port) translation for subsequent packets of the network connection. In the present specification, a NAPT connection is referred to a network connection whose packets need performing NAPT.

In sum, NAPT can serve more computers than NAT to connect to the Internet with a fixed number of public IPs. In view of this, the present invention provides an apparatus and method, which is implemented with hardware circuits, for network address-port translation used in a switch controller, thereby serving more computers to connect to the Internet simultaneously and efficiently.

SUMMARY OF THE INVENTION

The object of the present invention is to provide a NAPT apparatus implemented with hardware circuits inside a network switch controller. The NAPT apparatus comprises: a translation table for storing related information of a plurality of NAPT connections, wherein the related information contains at least an IP and a port number; an IP table for storing available translated IPs; a packet parser for receiving a packet to be performed NAPT, parsing related fields of the packet, and generating part of required indexes according to transmission direction of the packet; and a packet translation module, coupled to the translation table, the IP table, and the packet parser, for performing NAPT. The transmission direction of the packet is either forward or backward. A forward packet has the same transmission direction as the initial packet of the NAPT connection that the forward packet belongs to, while a backward packet has the transmission direction reverse to the forward packet.

Another object of the present invention is to provide a NAPT method employing the NAPT apparatus mentioned above. The core concept of the NAPT method is to generate a set of indexes EIDX and GIDX corresponding to each forward packet according to its related fields. GIDX is used to search the IP table for an available translated IP. EIDX is used to select a row in the translation table, and then an entry, which stores related information of the NAPT connection associated with the forward packet, with some index S in the row is found or generated. Next, a recording means is employed to incorporate EIDX, GIDX and S into a translated port number (if GIDX is part of EIDX or the translation table stores GIDX, GIDX would not be incorporated), and the source IP and source port of the forward packet are translated into the translated IP and the translated port number respectively.

The purpose of the recording means is that when a backward packet is received, a restoring action corresponding to the recording means can be performed toward the destination port of the backward packet to restore indexes $EIDX_2$, $GIDX_2$, and $S_2$. Then, if a translated IP obtained by searching the IP table with $GIDX_2$ equals the destination IP of the backward packet, the destination IP is valid. If both the destination IP of the backward packet and related information of a NAPT connection obtained by searching the translation table with $EIDX_2$ and $S_2$ are valid, then the backward packet is a valid backward packet of the NAPT connection. If the backward packet is valid, the destination IP and destination port of the valid backward packet will be translated into the IP and port number of the related information of the obtained connection; if invalid, no NAPT action would be performed toward the backward packet.

Another object of the present invention is to provide several useful features for the above NAPT apparatus to enhance performance. These useful features include extending the related information of each connection stored in the translation table to further contain a connection time and a port number offset, and adding a CPU into the switch controller to cooperate with the NAPT apparatus of the present invention. In view of limitation of the translation table, a proper period of connection time, which is decreased every unit time, is given to each NAPT connection based on the protocol used. When the connection time of a specific connection is decreased to zero, the space of the translation table occupied by the specific connection is released, thereby upgrading efficiency of the translation table. The port number offset is used in generation of a translated port number. The port number offset allows a user to adjust value range thereof to increase available port numbers on one hand, and helps to examine a backward packet to assure validity of the backward packet on the other hand.

The feature of adding a CPU into the switch controller enables the switch controller to process packets which the NAPT apparatus fails to translate when the translation table incurs a collision. Thus, NAPT performance is upgraded, and robustness of the NAPT apparatus of the present invention is also enhanced.

DETAILED DESCRIPTION OF THE PRESENT INVENTION

This section will provide a detailed description about one preferred embodiment of the NAPT apparatus and four preferred embodiments of the NAPT method to make the objects and features of the present invention more apparent and easy to understand.

Figure 2:
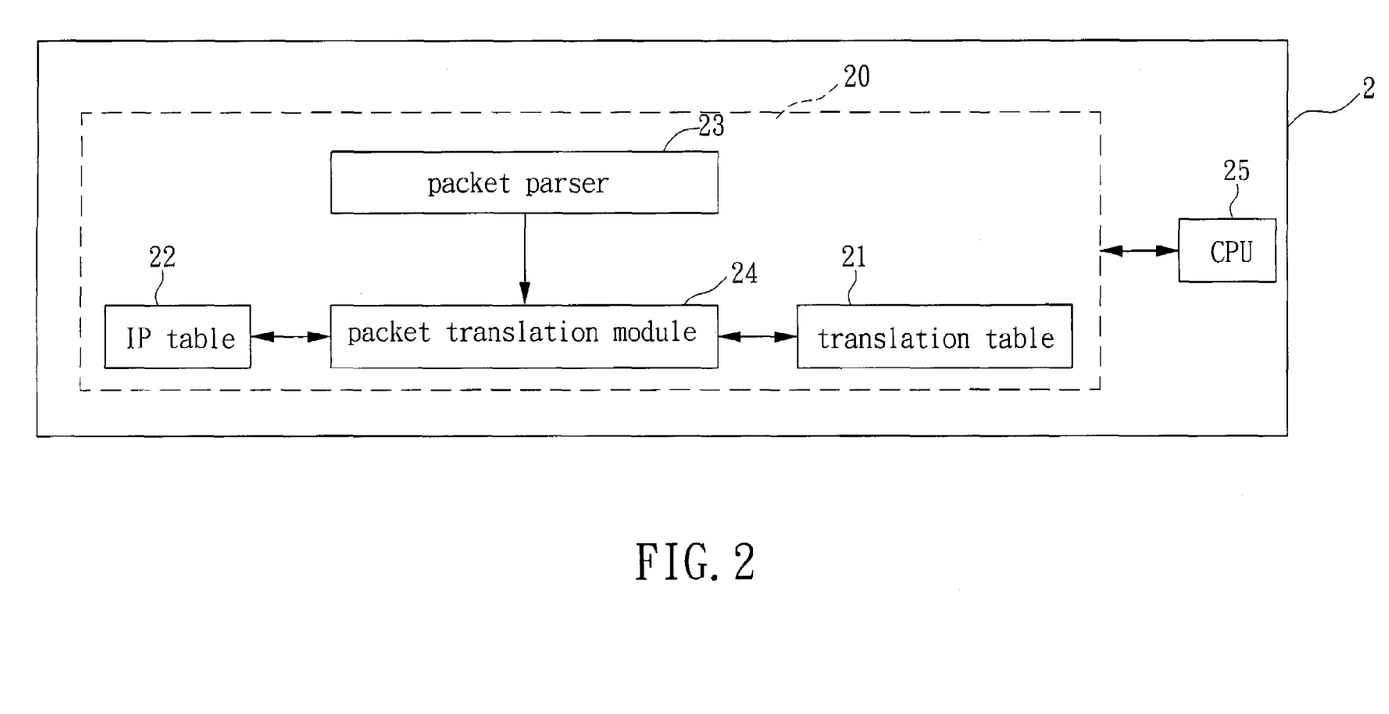
FIG. 2 is a block diagram of the preferred embodiment of the NAPT apparatus according to the present invention.

FIG. 2 is a block diagram of the preferred embodiment of the NAPT apparatus according to the present invention. As shown in FIG. 2, the NAPT apparatus 20 lies in a switch controller 2 and comprises: a translation table 21 for storing related information of a plurality of NAPT connections; an IP table 22 for storing a plurality of external IPs; a packet parser 23 for receiving a packet to be performed NAPT, parsing related fields of the packet, and generating part of required indexes according to transmission direction of the packet; and a packet translation module 24, coupled to the translation table 21, the IP table 22, and a packet parser 23, for performing NAPT for the packet. Here a forward packet means that the packet is transmitted from an internal network to an external network, and a backward packet means that the packet is transmitted from the external network to the internal network.

Also shown in FIG. 2, the switch controller 2 further comprises a CPU 25 coupled to the NAPT apparatus 20, for processing packets that the NAPT apparatus fails to translate. It is notable that the NAPT apparatus can still work without the CPU 25. The incorporation of CPU 25 can upgrade NAPT performance, especially when a collision occurs in the translation table 21, as described below.

Figure 3:
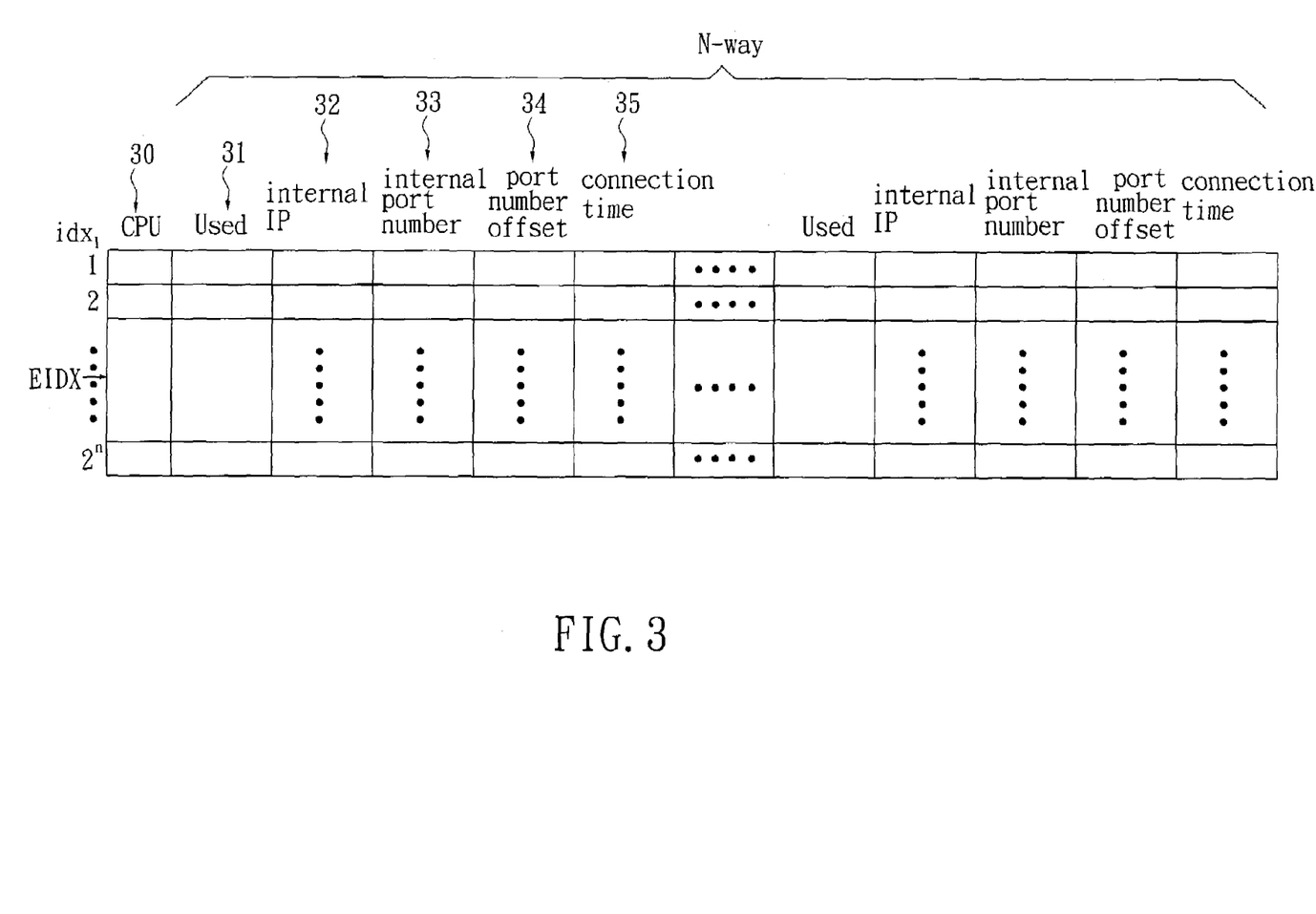
FIG. 3 is a block diagram showing a format of the translation table of FIG. 2 according to the present invention.

FIG. 3 is a block diagram showing a format of the translation table 21 according to the present invention. As shown in FIG. 3, the translation table 21 is an N-way set-associative cache, wherein $N=2^p$, p is a positive integer. The translation table 21 comprises $2^n$ cache lines, wherein n is a positive integer. Each cache line has an n-bit first index $idx_1$ and stores a CPU bit 30 for indicating whether a packet is provided to the CPU 25 in some specific situations (described below). Each cache line contains N entries since the translation table 21 is a N-way set-associative cache. Each of the N entries has a p-bit third index $idx_3$ and stores related information of a NAPT connection, wherein the related information comprises fields of Used bit 31, internal IP 32, internal port number 33, port number 34, and connection time 35. These fields are described below:

Used bit 31: used to indicate whether the current entry is in use. If in use, the Used bit 31 is set to show that the information stored in the current entry is valid and can be employed to perform NAPT for the associated connection. If not in use, the Used bit 31 is then cleared to show that the information in the current entry is invalid and thus NAPT for the associated connection is stopped.

Internal IP 32: used to record the source IP of a forward packet of the associated connection (i.e. the IP used by an internal network device, e.g. the private IP). An internal IP comprises 32 bits according to the current IP version.

Internal port number 33: 16 bits long, used to record the source IP/identifier of the forward packet. Here the port number refers generally to the port number field defined in TCP/UDP or the identifier field defined in ICMP.

Port number offset 34: used to record first several bits of the destination port of the forward packet after performing NAPT. The number of these bits, which is configurable, depends on which embodiment of the NAPT method is adopted.

Connection time 35: used to record remaining unit times for maintaining the associated connection and initialized as a predetermined value T. The packet translation module 24 decreases the connection time 35 of all the entries with the Used bit 31 set by one every unit time. If the connection time 35 of a certain entry becomes zero, the packet translation module 24 clears the Used bit 31 of the certain entry, and the certain entry can be released and used for another NAPT connection. The length of T and unit time depends on the protocol used by the associated connection.

It is notable that when N is equal to 1, $idx_3$ is not necessary for the translation table 21, and the NAPT apparatus 20 can still work in a simpler way according to the present invention.

Figure 4:
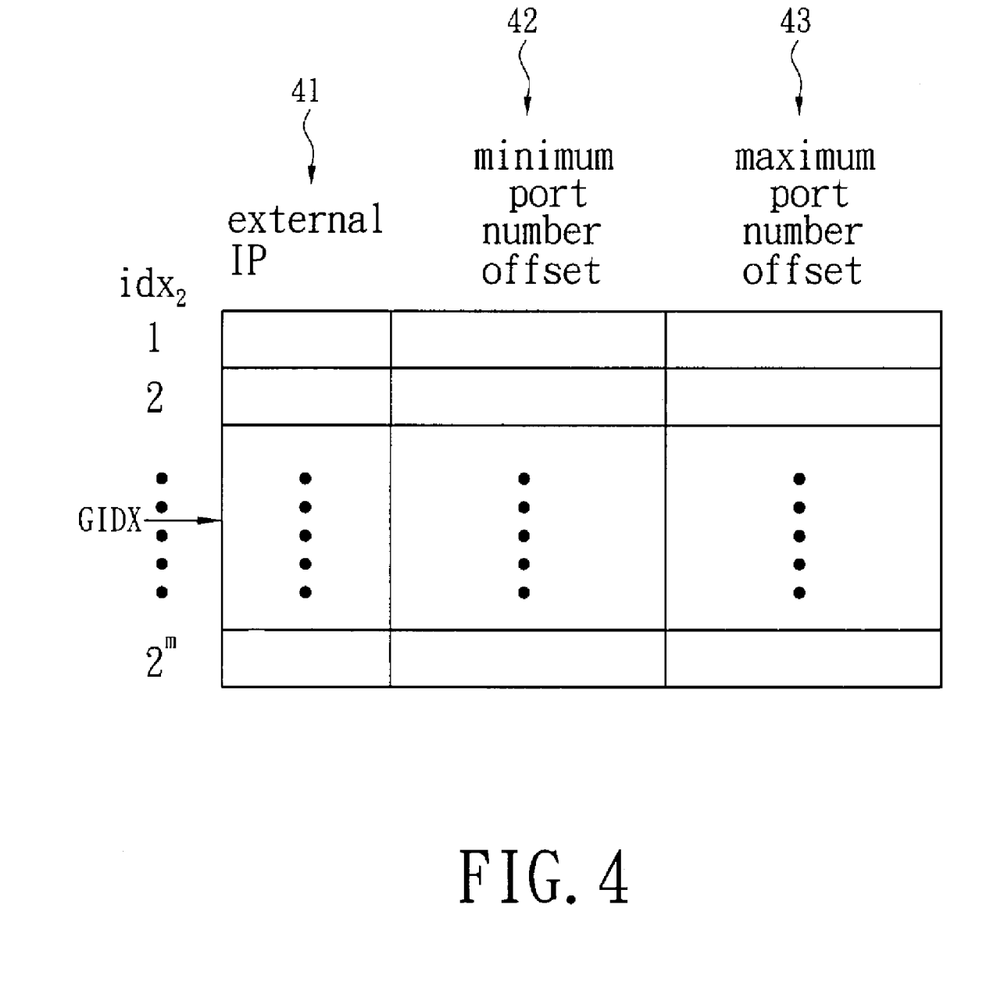
FIG. 4 is a block diagram showing a format of the IP table of FIG. 2 according to the present invention.

FIG. 4 is a block diagram showing a format of the IP table 22 according to the present invention. As shown in FIG. 4, the IP table 22 is a cache memory comprising $2^m$ entries, wherein m is a positive integer, and each entry has an m-bit second index $idx_2$ and stores an external IP 41, a minimum port number offset 42, and a maximum port number offset 43. The external IP 41 is an IP that can be used in an external network, such as the public IP mentioned above. Both the minimum port number offset 42 and the maximum port number offset 43 contain a plurality of bits (the number of bits depends on which embodiment of the NAPT method is adopted) that specify a range of the port number offset 34 available for the corresponding external IP 41.

It should be emphasized that the type of cache memory used to implement the translation table 21 and the IP table 22, such as a direct-mapped cache, a fully associative cache, or a multiway set-associative cache, is irrelevant to the objects of the present invention.

The packet parser 23 parses the source IP, source port, destination IP, and destination port of a packet to be performed NAPT and also generates part of indexes necessary for the packet translation module 24 to perform NAPT. When the packet is a forward packet, the packet parser 23 generates an n-bit index EIDX and an m-bit index GIDX according to the parsed fields of the packet; when the packet is a backward packet, the packet parser 23 analyzes the destination port of the backward packet to generate the part of indexes. The ways to generate EIDX and GIDX and to analyze the destination port of the backward packet vary with the embodiments of NAPT method, as described in detail below.

The n-bit index EIDX for a forward packet enables the packet translation module 24 to maintain the translation table 21. The packet translation module 24 selects a cache line with $idx_1$=EIDX in the translation table 21 and searches the cache line for an entry storing related information of the NAPT connection which the forward packet belongs to. If the search returns a miss, it means that the NAPT connection is a new one. Then the packet translation module 24 proceeds to search the cache line for an entry with the Used bit 31 cleared to store the related information of the NAPT connection. By maintaining the translation table 21, an entry storing the related information of the NAPT connection in the cache line with $idx_1$=EIDX is found or generated, and $idx_3$ and the port number offset 34 of the entry are also obtained.

The m-bit index GIDX for a forward packet is used to specify an external IP 41 of the IP table 22 when the packet translation module 24 performs NAPT for the forward packet.

The packet translation module 24 performs NAPT in different ways according to different transmission directions of packets. If a forward packet is received, the packet translation module 24 performs a recording procedure to record EIDX and GIDX generated by the packet parser 23 and S and the port number offset 34 obtained by maintaining the translation table 21 in a translated port number or a newly-added field of the translation table 21. By performing the recording procedure, the packet translation module 24 and the packet parser 23 can cooperate to perform a corresponding restoring procedure when receiving a backward packet, thereby restoring indexes $EIDX_2$, $GIDX_2$, and $S_2$ and a second port number offset used to examine whether the backward packet is valid. At last, the packet translation module 24 translates the source IP and source port of the forward packet into the external IP 41 of the entry with $idx_2$=GIDX and the translated port number respectively.

When a backward packet is received, the packet translation module 24 and the packet parser 23 cooperate to perform the restoring procedure. Then the packet translation module 24 examines the validity of the backward packet based on restored values. If the backward packet is valid, then the packet translation module 24 translates the destination IP and destination port of the backward packet into the internal IP 32 and internal port number 33 respectively in related information of the NAPT connection which the backward packet belongs to. The recording procedure, the corresponding restoring procedure, and the ways to examine the validity of backward packets vary with the embodiments of NAPT method, as described in detail below.

Next, the NAPT method employing the NAPT apparatus 20 is explained in detail. Since the NAPT method is performed with different steps according to different transmission directions of packets, the steps for processing forward and backward packets are discussed separately below.

Figure 5:
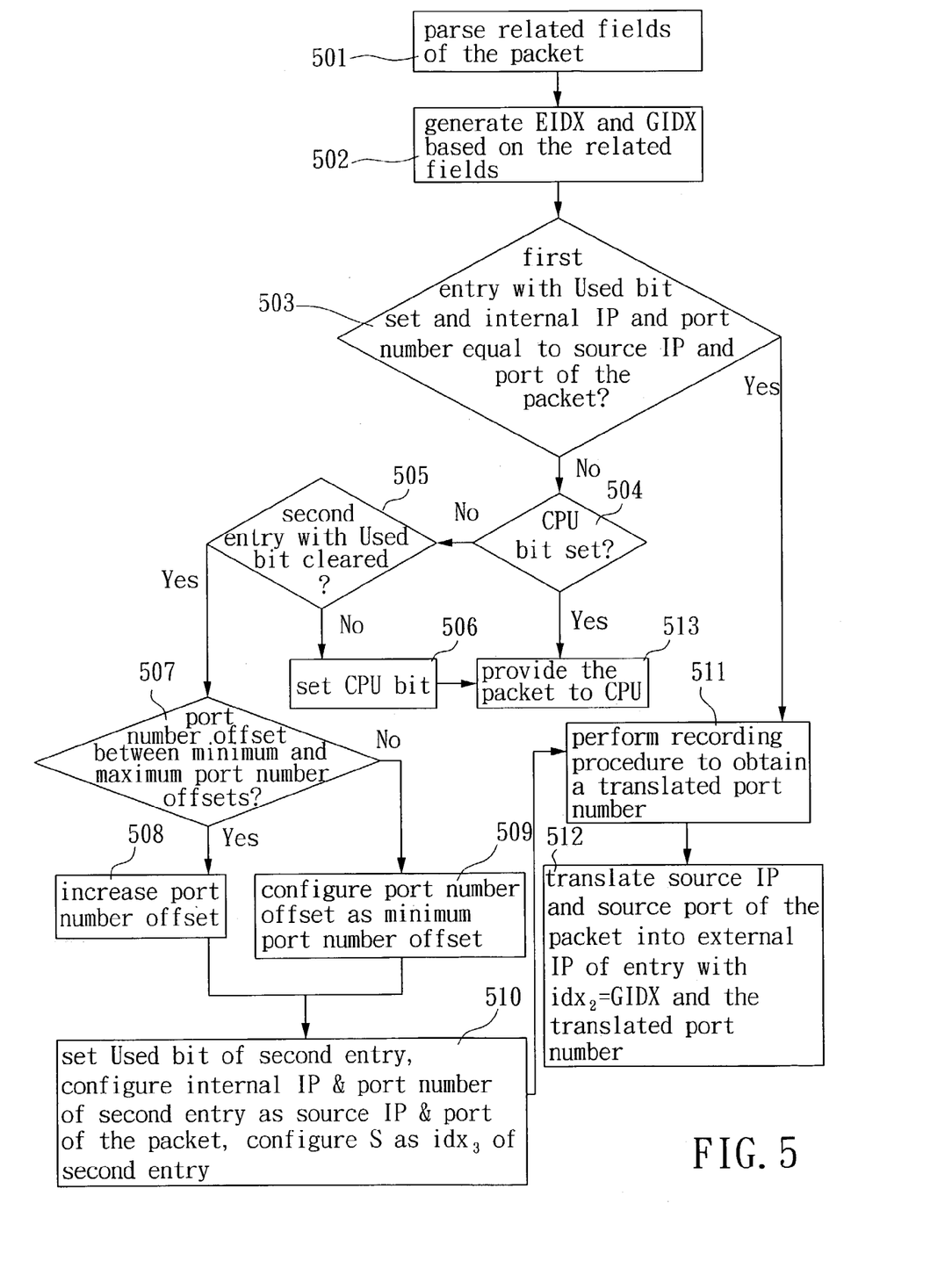
FIG. 5 is a flowchart illustrating the NAPT method for processing a forward packet according to the present invention.

FIG. 5 is a flowchart illustrating the NAPT method for processing a forward packet according to the present invention. As shown in FIG. 5, the flow comprises steps of:

501 parsing the source IP, source port, destination IP, and destination port of the forward packet;

502 generating indexes EIDX and GIDX based on the parsed fields;

503 checking whether there exists a first entry with the Used bit 31 set in a first cache line with $idx_1$=EIDX of the translation table 21, such that the internal IP 32 and internal port number 33 of the first entry equal to the source IP and source port of the forward packet respectively, and proceeding to step 511 if a hit is returned;

504 checking whether the CPU bit 30 of the first cache line is set, and proceeding to step 513 if set;

505 checking whether there exists a second entry with the Used bit 31 cleared, and proceeding to step 507 if a hit is returned;

506 setting the CPU bit 30 of the first cache line and proceeding to step 513;

507 examining whether the port number offset 34 of the second entry lies between the minimum port number offset 42 and maximum port number offset 43 of the entry with $idx_2$=GIDX in the IP table 22, and proceeding to step 509 if examining result is positive;

508 increasing the port number offset 34 of the second entry by one and proceeding to step 510;

509 configuring the port number offset 34 of the second entry as the minimum port number offset 42 of the entry with $idx_2$=GIDX in the IP table 22;

510 setting the Used bit 31 of the second entry, configuring the internal IP 33 and internal port number 34 of the second entry as the source IP and source port of the forward packet respectively, and configuring an index S as $idx_3$ of the second entry;

511 performing a recording procedure to obtain a translated port number according to EIDX, GIDX, S, and the port number offset 34 of the entry with $idx_3$=S in the first cache line;

512 translating the source IP and the source port of the forward packet into the external IP 41 of the entry with $idx_2$=GIDX in the IP table 22 and the translated port number; and 513 providing the forward packet to the CPU 25.

Wherein, the packet parser 23 performs the steps 501 and 502, and the packet translation module 24 performs all remaining steps.

Figure 6:
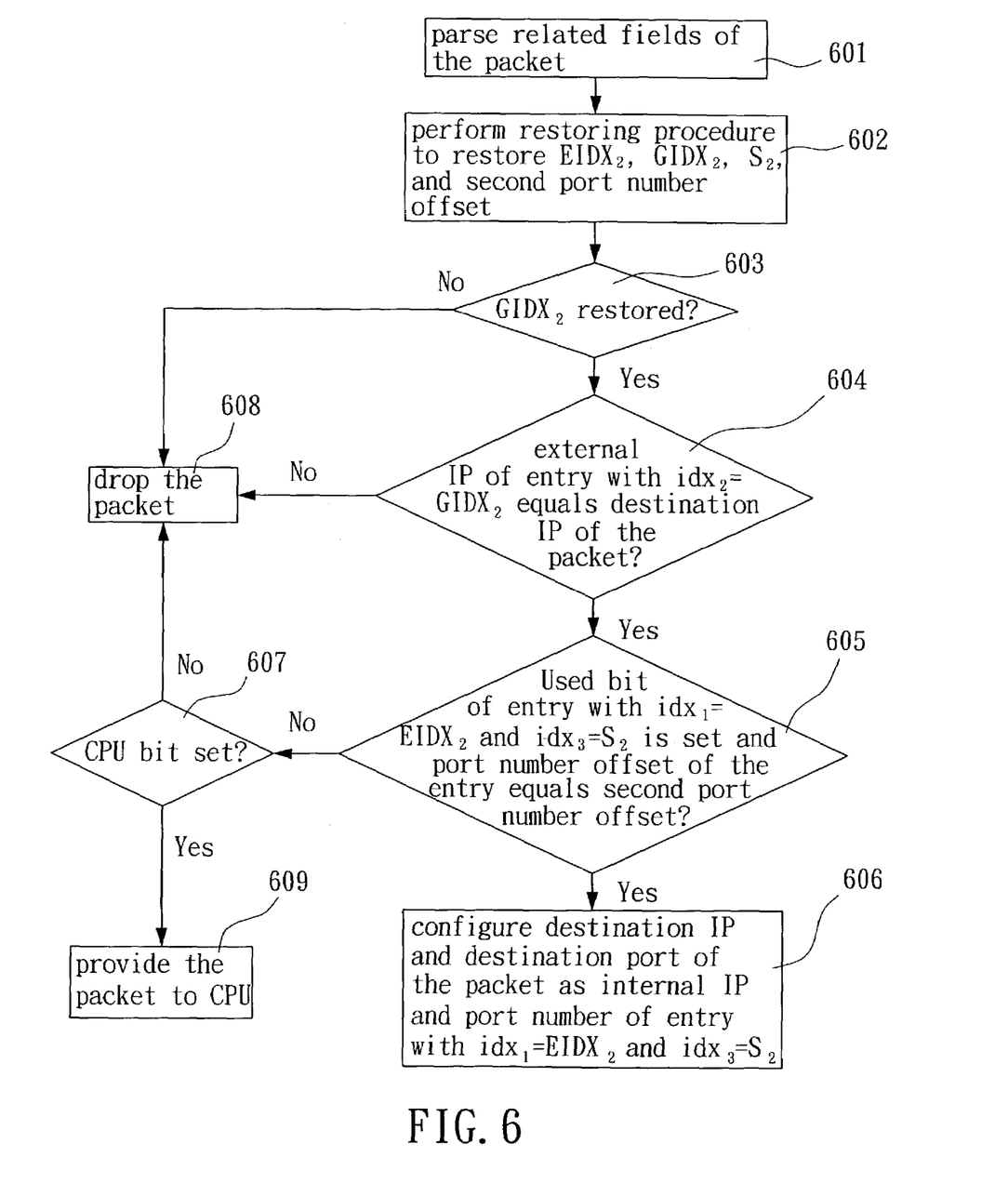
FIG. 6 is a flowchart illustrating the NAPT method for processing a backward packet according to the present invention.

FIG. 6 is a flowchart illustrating the NAPT method for processing a backward packet according to the present invention. The key point of the flowchart in FIG. 6 is to examine the validity of the backward packet. If the backward packet is valid, NAPT is then performed for the backward packet. As shown in FIG. 6, the flow comprises steps of:

601 parsing the source IP, source port, destination IP, and destination port of the backward packet;

602 performing a restoring procedure to restore indexes $EIDX_2$, $GIDX_2$, $S_2$, and a second port number offset;

603 proceeding to step 608 if $GIDX_2$ can not be restored;

604 checking whether the external IP 41 of an entry with $idx_2$=$GIDX_2$ is equal to the destination IP of the backward packet when $GIDX_2$ is not restored by searching the IP table 22 for an entry whose external IP 41 equals the destination IP of the backward packet, and proceeding to step 608 if not equal;

605 examining whether the Used bit 31 of an entry with $idx_3$=$S_2$ in a second cache line with $idx_1$=$EIDX_2$ is set and the port number offset 34 of the entry equals the second port number offset, and proceeding to step 607 if examining result is negative;

606 translating the destination IP and destination port of the backward packet into the internal IP 33 and internal port number 34 of the entry with $idx_3$=$S_2$ in the second cache line;

607 checking whether the CPU bit 30 of the second cache line is set, and proceeding to step 609 if set;

608 dropping the backward packet and ending the flow; and 609 providing the backward packet to the CPU 25.

Wherein, the packet parser 23 performs the step 601 and cooperates with the packet translation module 24 to perform the step 602, and the packet translation module 24 performs all remaining steps.

The restoring procedure in the step 602 is performed in a way reverse to the recording procedure in the step 511. Thus, the simpler the recording procedure is, the simpler the corresponding restoring procedure becomes. The recording means used in the method embodiments of the present invention mainly comprises connecting the port number offset and the related indexes one after another to form the translated port number, wherein if EIDX includes GIDX or an additional field in each entry of the translation table 21 is used to store GIDX, the composition of the translated port number can then be simplified, as described below.

The object of the steps 603-605 is to examine the validity of the backward packet. In the step 603, if $GIDX_2$ cannot be restored, the backward packet is invalid and does not need NAPT. Furthermore, if $GIDX_2$ is restored by searching the IP table 22 for the entry whose external IP 41 equals the destination IP of the backward packet, the destination IP of the backward packet is valid. If $GIDX_2$ is not restored in this way, the step 604 is performed to further check whether the destination IP of the backward packet is valid.

After the validity of the destination IP is confirmed, the step 605 is performed to select an entry of the translation table 21 with $EIDX_2$ and $S_2$, thereby examining whether the Used bit 31 of the entry is set and the port number offset 34 of the entry equals the second port number offset. If the examining result is positive, then it is assured that the backward packet is a valid backward packet of the NAPT connection recorded in the entry.

The four preferred embodiments of the NAPT method of the present invention are implemented according to the flowcharts of FIGS. 5 and 6. However, the four embodiments are differentiated in the means for generating EIDX and GIDX in the step 502, the recording procedure of the step 511, and the restoring procedure of the step 602. A detailed description of the four embodiments focusing on these differences is provided below.

Embodiment I

In the step 502, EIDX is generated by executing a hash function with independent variables of the related fields of the forward packet, i.e. the source IP, source port, destination IP, and destination port. GIDX is first m bits of EIDX. By using the hash function, the generated first index EIDXs would display a random and uniform distribution over the whole translation table 21 such that the entries therein can be used averagely. It is notable that the type of hash function used is irrelevant to implementation of the NAPT method of the present invention, and thus MD5, CRC, XOR, or any other hash algorithm can be used in the present invention. The fact that GIDX is the first m bits of EIDX is equivalent to dividing the translation table 21 into $2^m$ blocks logically, wherein each block corresponds to an external IP 41. Therefore, as soon as the packet parser 23 generates EIDX for the forward packet, the external IP 41 used to translate the source IP of the forward packet is also determined.

Figure 7:
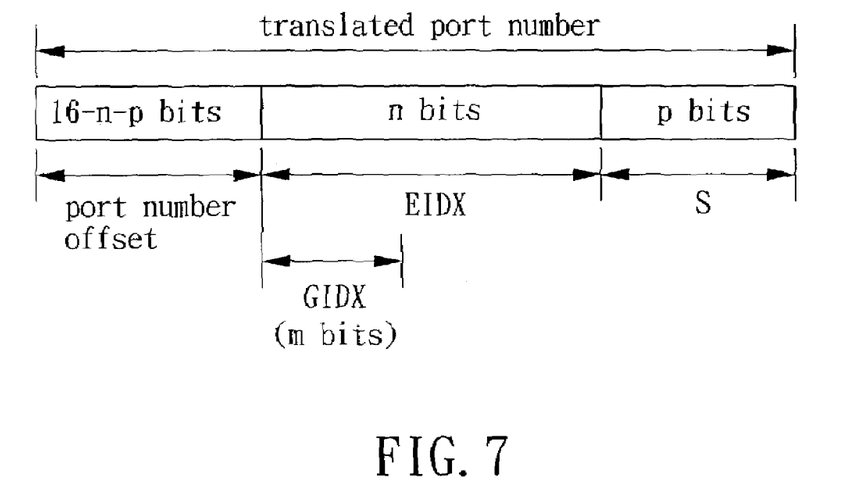
FIG. 7 is a diagram illustrating composition of the translated port number for the embodiment I of the NAPT method according to the present invention.

Since GIDX is included in EIDX, the recording procedure of the step 511 is simpler, that is, the translated port number for translating the source port of the forward packet is generated by connecting the port number offset 34 of the entry with $idx_3=S$ in the first cache line, EIDX, and S one after another, as shown in FIG. 7. On the other hand, in the restoring procedure of the step 602, the packet parser 23 only needs analyzing the destination port of the backward packet to restore $EIDX_2$, $GIDX_2$, $S_2$, and the second port number offset.

Embodiment II

Figure 8:
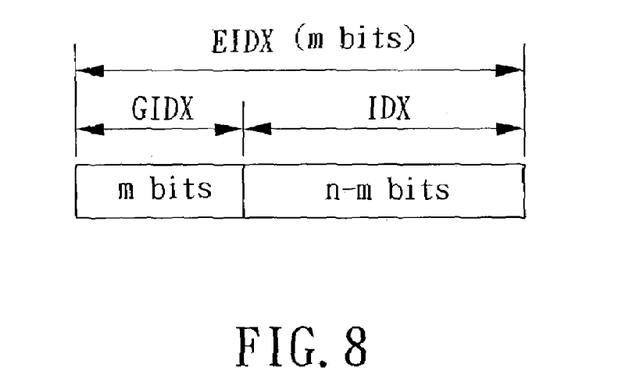
FIG. 8 is a diagram illustrating composition of EIDX for the embodiment II of the NAPT method according to the present invention.
Figure 9:
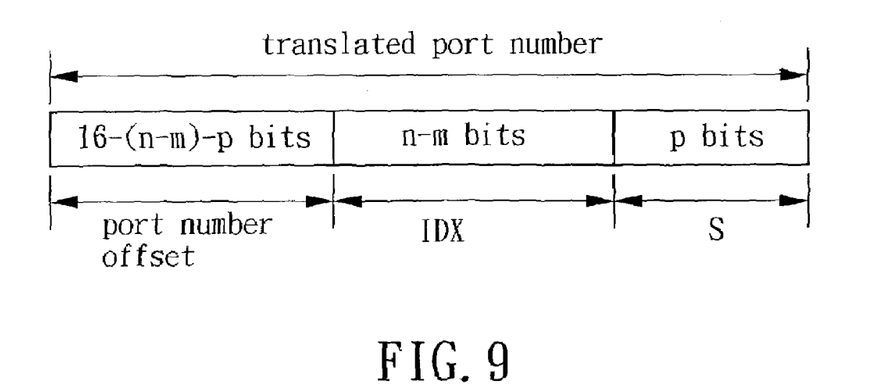
FIG. 9 is a diagram illustrating composition of the translated port number for the embodiment II of the NAPT method according to the present invention.

In the step 502, an index IDX is first generated by executing a first hash function with independent variables of the related fields of the forward packet, and GIDX is generated by executing a second hash function with an independent variable of the source IP of the forward packet. Then EIDX is generated by connecting GIDX and IDX one-after the other, as shown in FIG. 8. By executing another hash function to generate GIDX and using only the source IP of the forward packet as the independent variable, it can be assured that all packets transmitted from a certain computer within the internal network contains the same external IP 41 after NAPT. In the recording procedure of the step 511, the translated port number is generated by connecting the port number offset 34 of the entry with $idx_3=S$ in the first cache line, IDX, and S one after another, as shown in FIG. 9. On the other hand, in the restoring procedure of the step 602, the packet parser 23 first analyzes the destination port of the backward packet to restore indexes $IDX_2$, $S_2$, and the second port number offset and then searches the IP table 22 for an entry with $idx_2=GIDX_2$ such that the external IP 41 of the entry equals the destination IP of the backward packet. If the search returns a hit, $EIDX_2$ is restored by connecting $GIDX_2$ and $IDX_2$ in the way similar to FIG. 8.

Embodiment IIIa

Figure 10:
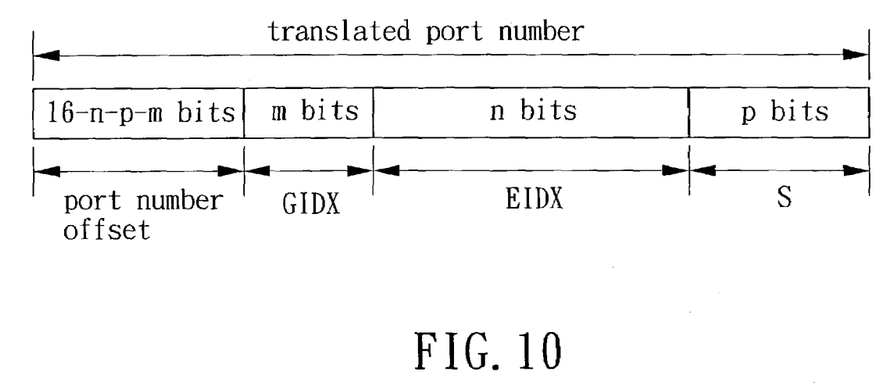
FIG. 10 is a diagram illustrating composition of the translated port number for the embodiment IIIa of the NAPT method according to the present invention.

In the step 502, EIDX is generated by executing a third hash function with independent variables of the related fields of the forward packet, and GIDX is generated by executing a fourth hash function with an independent variable of the source IP of the forward packet. Since GIDX is independent of EIDX, i.e. the external IP 41 used by the forward packet is irrelevant to EIDX, a mechanism in the recording procedure of the step 511 is needed for examining the validity of the destination IP of the backward packet after receiving the backward packet and performing the restoring procedure of the step 603. There are two implementations for this mechanism, and the first one is introduced here while the other one is described in the section <Embodiment IIIb>. Compared with the embodiment I, the first way to implement the mechanism further incorporates GIDX into the translated port number, as shown in FIG. 10, when performing the recording procedure of the step 511. On the other hand, in the restoring procedure of the step 602, $GIDX_2$ can be restored to check whether the destination IP of the backward packet equals the external IP 41 of the entry with $idx_2=GIDX_2$ in the IP table 22.

Embodiment IIIb

Figure 11:
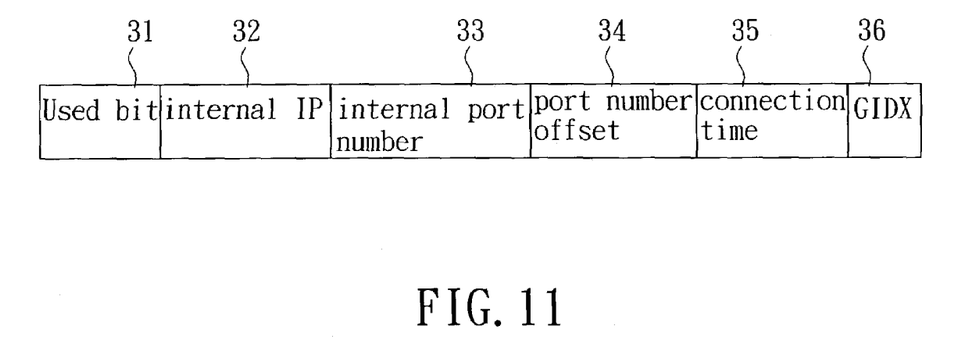
FIG. 11 is a diagram showing a format of a translation table entry used in the embodiment IIIb of the NAPT method according to the present invention.
Figure 12:
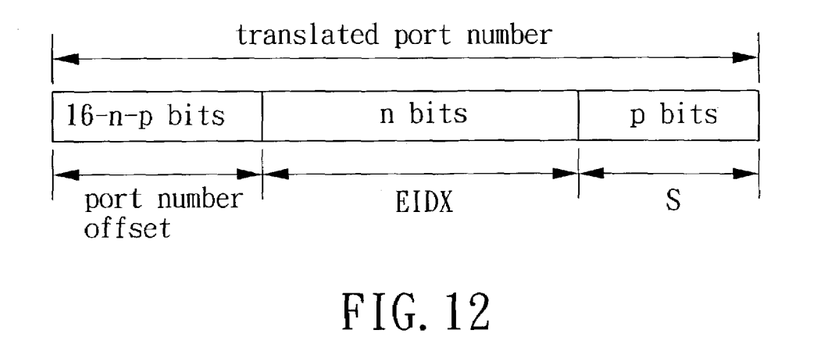
FIG. 12 is a diagram illustrating composition of the translated port number for the embodiment IIIb of the NAPT method according to the present invention.

The second way to implement the mechanism adds a GIDX field 36 for each entry of the translation table 21, as shown in FIG. 11. In the recording procedure of the step 511, if the NAPT connection that the forward packet belongs to is a new one, that is, the step 510 is performed to configure the second entry in the translation table 21, then GIDX generated by the step 502 is stored into the GIDX field 36 of the second entry. Without the need of GIDX, the translated port number is then generated by connecting the port number offset 34 of the entry with $idx_3=S$ in the first cache line, EIDX, and S one after another, as shown in FIG. 12. On the other hand, in the restoring procedure of the step 602, the packet parser 23 first analyzes the destination port of the backward packet to restore $EIDX_2$, $S_2$, and the second port number offset, and then the packet translation module 24 reads the GIDX field 36 of the entry with $idx_3=S_2$ in the cache line with $idx_1=EIDX_2$ to restore $GIDX_2$.

For all the above embodiments of the NAPT method, the connecting order for the components of the translated port number in the recording procedure is not limited, except the port number offset 34 should be put at the highest bits of the translated port number. In addition, the means to generate EIDX and GIDX in the step 502 is not limited to using hash functions.

At last, the function of the CPU 25 is explained below. For a forward packet of a connection to be performed NAPT, if the first entry corresponding to the connection is not found (see the step 503) and the unused second entry is not found (see the step 505), then a collision in the translation table 21 occurs. In addition, for a backward packet of the connection to be performed NAPT, if the Used bit 31 of the entry found with the restored values is not set or the port number offset 34 of the entry is not equal to the second port number offset (see the step 605), a collision also occurs. The CPU 25 contains storage space with a format similar to the entry of the translation table 21. When a packet incurs such a collision in the translation table 21, the CPU 25 takes over the packet, stores the information associated with the NAPT connection that the packet belongs to, and processes subsequent packets of the NAPT connection based on the stored information. When the translation table 21 releases its space, the CPU 25 can selectively write back the stored information to the translation table 21, thereby upgrading NAPT performance of the subsequent packets of the NAPT connection.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A network address-port translation (NAPT) apparatus used in a switch controller, comprising:
   a translation table comprising a plurality of cache lines, wherein each of the cache lines comprising of at least one first storage element for storing an internet IP address and an internet port number;
   an IP table comprising a plurality of second storage elements, wherein each of the second storage elements stores a translated IP address;
   a packet parser generating indexes EIDX and GIDX according to related fields of forward packet, wherein the index EIDX corresponds to the translation table and is used to select one cache line in the translation table, and the index GIDX corresponds to the IP table and is used to select the available translated IP addresses in the IP table; and
   a packet translation module coupled to the translation table, the IP table and the packet parser, generating a translated port number though a recording procedure based on the indexes EIDX and GIDX, and retrieving one translated IP address from the IP table according to the index GIDX;

the packet translation module further translating a source IP and a source port of the forward packet into the retrieved translated IP address and the translated port number respectively; and when the packet parser receives a backward packet, the packet parser and the packet translation module cooperating to perform a restoring procedure corresponding to the recording procedure to determine whether the backward packet is to be performed NAPT, wherein the restoring procedure is performed to obtain the translated port number according to the indexes EIDX and GIDX if the internet protocol IP address and the port number of the first storage element with the index EIDX equal the source IP and the source port of the forward packet respectively.

2. The NAPT apparatus of claim 1, wherein the packet parser and the packet translation module perform the restoring procedure to restore the indexes EIDX and GIDX when the packet parser receives the backward packet.

3. The NAPT apparatus of claim 2, wherein the packet translation module drops the backward packet if the translated IP address read from the IP table according to the index GIDX not equals a destination IP of the backward packet.

4. The NAPT apparatus of claim 2, wherein each of the first storage elements further stores a port number offset, and the packet translation module generates the translated port number though the recording procedure based on the indexes EIDX, GIDX, and the port number offset read from the translation table according to the index EIDX.

5. The NAPT apparatus of claim 4, wherein a second port number offset is further restored by the restoring procedure, and if the translated IP address read from the IP table according to GIDX equals a destination IP of the backward packet and the port number offset read from the translation table according to EIDX equals the second port number offset, then the backward packet is to be performed NAPT.

6. The NAPT apparatus of claim 5, wherein the packet translation module translates the destination IP and a destination port of the backward packet respectively into the internet protocol IP address and the port retrieved from the translation table according to the index EIDX if the backward packet is to be performed NAPT.

7. The NAPT apparatus of claim 5, further comprising:
a CPU coupled to the packet translation module for processing an un-translated forward/backward packet, which is not translated by the packet translation module.

8. The NAPT apparatus of claim 7, wherein the packet translation module provides the forward packet to the CPU if the source IP and the source port of the forward packet do not equal the internet protocol IP address and the port read from the translation table according to the index EIDX.

9. The NAPT apparatus of claim 7, wherein the packet translation module provides the backward packet to the CPU if the translated IP address read from the IP table according to the index GIDX equals a destination IP of the backward packet and the port number offset read from the translation table according to the index EIDX does not equal the second port number offset.

10. The NAPT apparatus of claim 1, wherein the related fields of the forward packet comprise a source IP field, a source port field, a destination IP field, and a destination port field.

11. The NAPT apparatus of claim 10, wherein the packet parser generates the index EIDX though a first hash function according to the related fields of the forward packet and generates the index GIDX by using first m bits of the index EIDX, and the translated port number is generated by connecting the index EIDX and the port number offset read from the translation table according to the index EIDX in a specific order.

12. The NAPT apparatus of claim 10, wherein the packet parser generates the index EIDX though a fourth hash function according to the related fields of the forward packet and generates the index GIDX by a fifth hash function according to the source IP of the forward packet.

13. The NAPT apparatus of claim 12, wherein the translated port number is generated by connecting the indexes GIDX, EIDX and the port number offset read from the translation table according to the index EIDX in a specific order.

14. The NAPT apparatus of claim 12, wherein the first storage element with the index EIDX comprises an index field for storing the index GIDX, and the translated port number is generated by connecting the index EIDX and the port number offset read from the translation table according to the index EIDX in a specific order.

15. A network address-port translation (NAPT) method used in a switch controller comprising a translation table and an IP table, wherein the translation table comprises a plurality of first storage elements, each of the first storage elements corresponds to a first index EIDX and stores a Used bit, a first IP and a port number, the IP table comprises a plurality of second storage elements, and each of the second storage elements corresponds to a second index GIDX and stores a second IP, for a forward packet to be performed NAPT the method comprising steps of:

(a) generating the first index EIDX and the second index GIDX according to related fields of the forward packet, wherein the first index EIDX corresponds to the translation table and is used to select a cache line in the translation table, and the second index GIDX corresponds to the IP table and is used to select an available translated IP addresses in the IP table;

(b) configuring the first IP and the port number of the first storage element with the first index EIDX as a source IP and a source port of the forward packet respectively according to an Used bit of the first storage element with the first index EIDX;

(c) performing a recording procedure to obtain a translated port number which comprises an information corresponding to at least one of the first index EIDX and the second index GIDX according to the first and the second indexes EIDX and GIDX if the first IP and the port number of the first storage element with the first index EIDX equal the source IP and the source port of the forward packet respectively, wherein the recording procedure has a corresponding restoring procedure for a backward packet to be performed NAPT; and (d) translating the source IP and the source port of the forward packet into the second IP of the second storage element with the second index GIDX and the translated port number respectively.

16. The NAPT method of claim 15, wherein for the backward packet the method, further comprises steps of:

(e) performing the restoring procedure to try to restore a first index EIDX and a second index GIDX;

(f) checking whether the second IP of the second storage element with the second index GIDX equals a destination IP of the backward packet when GIDX is not restored by searching the IP table;

(g) determining whether the Used bit of the first storage element with the first index EIDX is set when the second IP of the second storage element with the second index GIDX equals the destination IP of the backward packet; and (h) translating the destination IP and a destination port of the backward packet into the first IP and the port number of the first storage element with the first index EIDX respectively when the Used bit of the first storage element with the first index EIDX is set.

17. The NAPT method of claim 16, wherein the backward packet is dropped if the checking of the step (f) shows inequality.

18. The NAPT method of claim 16, wherein each of the first storage elements further stores a port number offset, and in the step (c) the recording procedure is performed according to EIDX, GIDX, and the port number offset of the first storage element with the first index EIDX if the first IP and the port number of the first storage element with the first index EIDX equal the source IP and the source port of the forward packet respectively.

19. The NAPT method of claim 18, wherein in the step (e) a second port number offset is further restored by the restoring procedure, the step (g) further comprises examining whether the port number offset of the first storage element with the first index EIDX equals the second port number offset, and the translation of the step (h) is performed when the Used bit of the first storage element with the first index EIDX is set and the port number offset of the first storage element with the first index EIDX equals the second port number offset.

20. The NAPT method of claim 19, wherein the switch controller further comprises a CPU, and the forward packet is provided to the CPU if the Used bit of the first storage element with the first index EIDX is set and the first IP and the port number of the first storage element with the first index EIDX do not equal the source IP and the source port of the forward packet respectively.

21. The NAPT method of claim 20, wherein the backward packet is provided to the CPU if the performing of the step (g) shows that the Used bit of the first storage element with the first index EIDX is set and the port number offset of the first storage element with the first index EIDX does not equal the second port number offset.

22. The NAPT method of claim 16, wherein the related fields of the forward packet comprise a source IP field, a source port field, a destination IP field, and a destination port field.

23. The NAPT method of claim 22, wherein in the step (a) EIDX is generated though a first hash function according to the related fields of the forward packet and GIDX is generated by using first m bits of EIDX, and in the step (c) the recording procedure comprises connecting the port number offset of the first storage element with the first index EIDX and EIDX in a specific order to generate the translated port number.

24. The NAPT method of claim 22, wherein in the step (a) EIDX is generated though a fourth hash function according to the related fields of the forward packet and GIDX is generated though a fifth hash function according to the source IP of the forward packet.

25. The NAPT method of claim 24, wherein in the step (c) the recording procedure comprises connecting the port number offset of the first storage element with the first index EIDX, GIDX, and EIDX in a specific order to generate the translated port number.

26. The NAPT apparatus of claim 24, wherein the first storage element with the first index EIDX comprises an index field for storing GIDX, and in the step (c) the recording procedure comprises connecting the port number offset of the first storage element with the first index EIDX and EIDX in a specific order.

27. A network address-port translation (NAPT) method used in a switch controller comprising a translation table and an IP table, wherein the translation table comprises a plurality of first storage elements, each of the first storage elements corresponds to a first index and comprises at least two storage locations, each of the storage locations corresponds to a third index and stores a Used bit, a first IP, and a port number, the IP table comprises a plurality of second storage elements, and each of the second storage elements corresponds to a second index and stores a second IP, for a forward packet to be performed NAPT the method comprising steps of:

(a) generating a first index EIDX and a second index GIDX according to the forward packet, wherein the first index EIDX corresponds to the translation table and is used to select a cache line in the translation table, wherein the second index GIDX corresponds to the IP table and is used to select an available translated IP addresses in the IP table;

(b) configuring an index S as the third index of a first storage location in the first storage element with the first index EIDX when the Used bit of the first storage location is set and the first IP and the port number of the first storage location equal a source IP and a source port of the forward packet respectively;

(c) setting the Used bit of a second storage location in the first storage element with the first index EIDX, configuring the first IP and the port number of the second storage location as the source IP and the source port of the forward packet and configuring the index S as the third index of the second storage location when the Used bit of the second storage location is cleared;

(d) performing a recording procedure to obtain a translated port number according to EIDX, GIDX and S if the first/second storage location is found, wherein the recording procedure has a corresponding restoring procedure for a backward packet to be performed NAPT; and (e) translating the source IP and the source port of the forward packet into the second IP of the second storage element with the second index GIDX and the translated port number respectively.

* * * * *